United States Patent [19]

Klopfenstein

[11] Patent Number: 5,544,738
[45] Date of Patent: Aug. 13, 1996

[54] ADJUSTABLE POCKET MECHANISM

[75] Inventor: Kraig L. Klopfenstein, South Barrington, Ill.

[73] Assignee: The Paxall Group, Skokie, Ill.

[21] Appl. No.: 336,672

[22] Filed: Nov. 7, 1994

[51] Int. Cl.⁶ ................................................. B65G 15/14
[52] U.S. Cl. ............................ 198/626.5; 198/803.11; 53/257; 53/579; 493/475
[58] Field of Search .................... 198/473.1, 731, 198/626.5, 803.11; 53/249, 257, 579; 493/319, 474, 475

[56] References Cited

U.S. PATENT DOCUMENTS

| | | |
|---|---|---|
| 3,198,316 | 8/1965 | Bivans . |
| 4,571,236 | 2/1986 | Adams . |
| 4,718,540 | 1/1988 | Greenwell . |
| 5,328,021 | 7/1994 | Calvert et al. ............... 198/803.11 |

*Primary Examiner*—Joseph E. Valenza
*Attorney, Agent, or Firm*—Bacon & Thomas

[57] ABSTRACT

An adjustable pocket mechanism for a vertical cartoner includes a plurality of adjustable pockets to accommodate different sizes of cartons. The pocket mechanism includes a pair of endless parallel chains which pass around a pair of upper and lower sprockets. The mechanism also includes a pair of transport lugs or pocket forming members which define the outer parameters of a carton. A first of lugs or leading lug is fixed to a first of the chains but moves freely with respect to a second of the chains while a second of the lugs is fixed to the second of the chains and free to move with respect to the first chain. A clutch assembly may be used to adjust the position of the chains relative to one another in order to vary the size of the pocket. The adjustable pocket mechanism also includes a guide rod disposed in a sleeve.

5 Claims, 3 Drawing Sheets

ADJUSTABLE POCKET MECHANISM

FIELD OF THE INVENTION

This invention relates to an adjustable pocket mechanism for a cartoner or the like and more particularly to an apparatus for changing a cartoner over from one size of carton to another and for maintaining a carton square as it is carried through the filling and sealing operations.

BACKGROUND FOR THE INVENTION

Cartoning apparatus normally contain a magazine for receiving a supply of flat folded carton blanks and apparatus for ejecting those carton blanks from the magazine and erecting them into a generally rectangular tubular form. The cartoner typically includes a pair of endless chains, one carrying leading transport lugs and the other carrying trailing transport lugs. In such apparatus, a carton is erected and captured between the leading and trailing transport lugs. The carton is then held between these lugs as it passes through a filling station.

As the carton passes through the filling station, a barrel loader thrusts product into the carton, and as it passes through a gluing and flap closing apparatus, the carton is sealed. However, if a carton as it is transported through the sealing stages is not square, the flaps are misaligned on the resulting package making it an unsightly or unacceptable package.

In typical applications, cartoner require frequent changeovers for running different sizes of cartons. In the changeover, mechanics use wrenches to loosen parts, slip the parts relative to one another and retighten the parts to fix them in that position. For example, the chain carrying the leading lug is physically shifted with respect to the chain carrying the trailing lugs to accommodate cartons of greater or lesser length. In this case, length refers to the dimension in the direction of machine movement, i.e., the carton width taken across the "face" or front panel of a carton.

One approach for automatically changing a carton over from one size to another is disclosed in U.S. Pat. No. 4,718,540 of Greenwell, which is incorporated herein in its entirety by reference. That patent discloses a horizontal cartoner having a main drive, an element, such as transport lugs and product bucket elements that are adjustable to accommodate different sizes of canons. The patent also discloses automatic means for varying the position of those elements automatically using the power of the main drive to accomplish the adjustment while the machine is running. For example, if the machine is set to run a particular product and carton size, it is possible that the delivered carton may be dimensionally different from a previous run and do not handle as well. However, adjusting the transport lugs with respect to each other while the machine is running enables an operator to make adjustments while observing the operation on the machine. In essence, the phase adjusting system effects the linear adjustment of the center chain with respect to the outside chains, thereby adjusting the spacing between the leading and trailing transport lugs to accommodate different sizes of cartons.

The concept of a mechanism for squaring a carton is addressed in U.S. Pat. No. 4,571,236 of Adams. As disclosed therein, all of the leading lugs are inclined rearwardly at a slight angle from a vertical attitude. Thus, the rearwardly incline leading lugs will engage the upper leading corner of the carton. The center chain carrying the leading lugs is then adjusted longitudinally with respect to the chains carrying the trailing lugs so that the spacing of the lugs can be altered into the cartons carried between the lugs are maintained in a squared attitude through the processing.

It has now been recognized that there may be a significant demand for an improved cartoner which maintains parallelism when the apparatus is moving along a non-linear path. It is also desirable that the apparatus maintains the squareness of a container as it moves through the filling station and along a non-linear path so that the filling station may be located in various positions along the path.

It is presently believed that an improved cartoner according to the present invention will provide the aforementioned desirable features. It is also believed that an improved cartoner in accordance with the present invention provides means permitting individual or simultaneous adjustment of a fixture or locational device and means for the parallel adjustment for two or more surfaces. In addition, the approach according to the present invention provides for manual or power driven adjustment and an opportunity for position monitoring during the operation of the cartoner.

In addition, an improved cartoner in accordance with the present invention maintains parallelism when the cartoner is dynamically loaded and isolates the driving mechanism from external bending moments. The cartoner maintains parallelism throughout the entire process even in those cases where a drive chain has become stretched or worn. The apparatus also allows variation in cord length versus are length of the chain to be controlled and compensated for as illustrated hereinafter. In addition, such cartoners can be economically manufactured and marketed in a competitive market, readily installed and maintained and are durable.

BRIEF SUMMARY OF THE INVENTION

In essence, the present invention contemplates an adjustable pocket mechanism for a cartoner of the type which includes a plurality of adjustable pockets to accommodate different sizes of cartons. The cartoner transports the cartons along a non-linear pathway as it is carried through its filling and sealing operations. The adjustable pocket mechanism comprises a pair of parallel endless chains and a leading transport lug which is fixed to a first of the chains and generally freely movable (forwardly or rearwardly to the direction of movement) with respect to the second of the chains. The adjustable pocket mechanism also includes a second or trailing lug which is fixed to the second of the chains and freely movable (forwardly and rearwardly in the direction of movement) with respect to the first of the chains. Means for adjusting the chains relative to one another and means for fixing the relative position of the chains are provided, so that a pocket formed by the leading and trailing lugs can be adjusted to accommodate different sizes of cartons. The adjustable pocket mechanism also includes means for maintaining the leading and trailing lugs parallel as the pocket is transported along a non-linear pathway.

In a preferred embodiment of the invention, the means for maintaining the leading and trailing lugs parallel as the pocket is transported along a non-linear pathway includes a guide rod and sleeve assembly. In this embodiment, the rod is fixed within a sleeve in one of the lugs and slidably engages the sleeve of the other lug as one of the chains is moved with respect to the other. When the position of the chains are fixed with respect to one another, the rod and sleeve assembly maintain the lugs in a parallel relationship as the lugs follow and are moved along a non-linear passageway.

3

The invention will now be described in connection with the accompanying drawings wherein like reference numerals have been used to designate like parts.

DESCRIPTION OF THE PREFERRED EMBODIMENTS OF THE INVENTION

Figure 1:
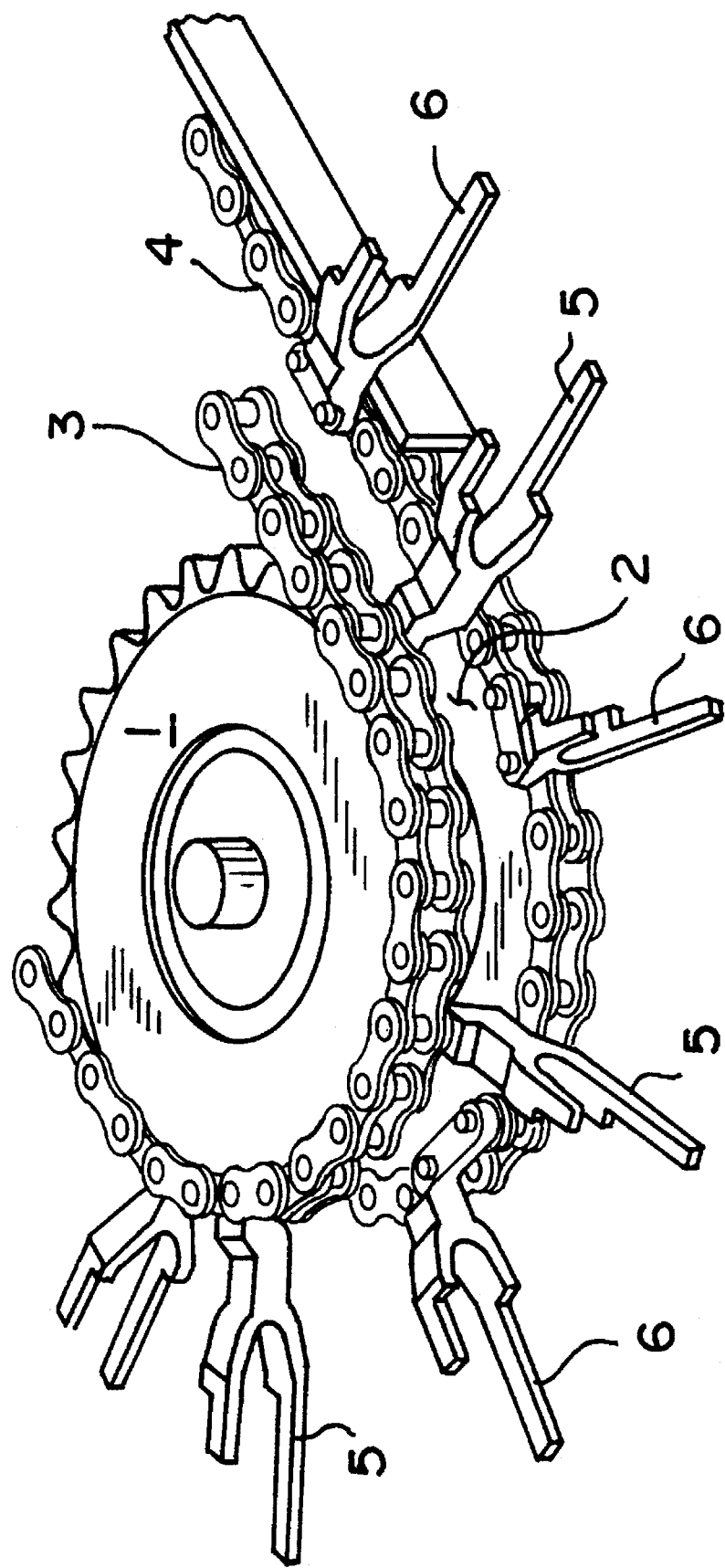
FIG. 1 is a perpendicular view of a prior art sprocket drive for a carton conveyor.

FIG. 1 shows a prior art sprocket drive for a carton conveyor which includes upper and lower sprockets 1 and 2, each of which drive an endless chain 3 and 4. The upper chain 3 carries a plurality of leading finger-like elements 5 at spaced intervals therealong while the lower chain 4 carries a plurality of trailing finger-like elements 6. The finger-like elements 5 and 6 form one set which engages the opposite sides of a box (now shown in FIG. 1) and propels it along a horizontal flat bed of a machine. The finger-like elements 5 and 6 generally extend parallel to each other when they have departed from the sprocket, but extend outwardly in a radial direction from one another as the chains pass around the sprockets. Further details on the prior art device are included in U.S. Pat. No. 3,198,316 of E. L. Bivans, entitled, "Sprocket Drive For Carton Conveyor" which is incorporated herein in its entirety by reference.

Figure 2:
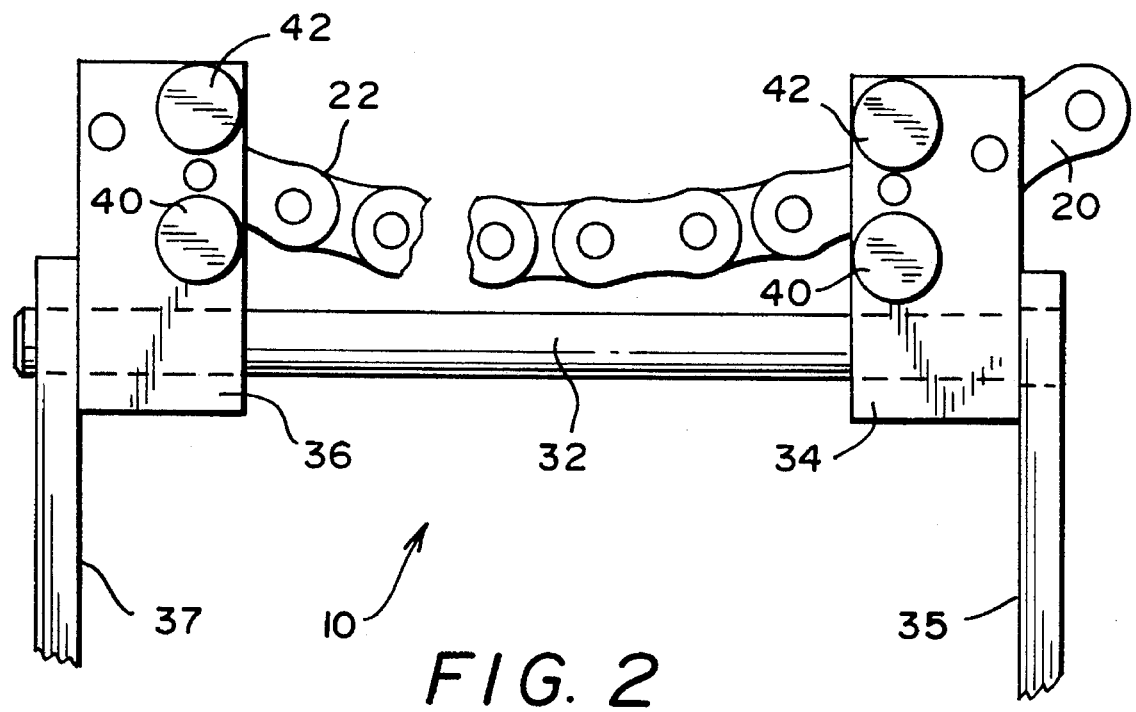
FIG. 2 is a top or plan view of an adjustable pocket mechanism in accordance with a preferred embodiment of the invention.
Figure 3:
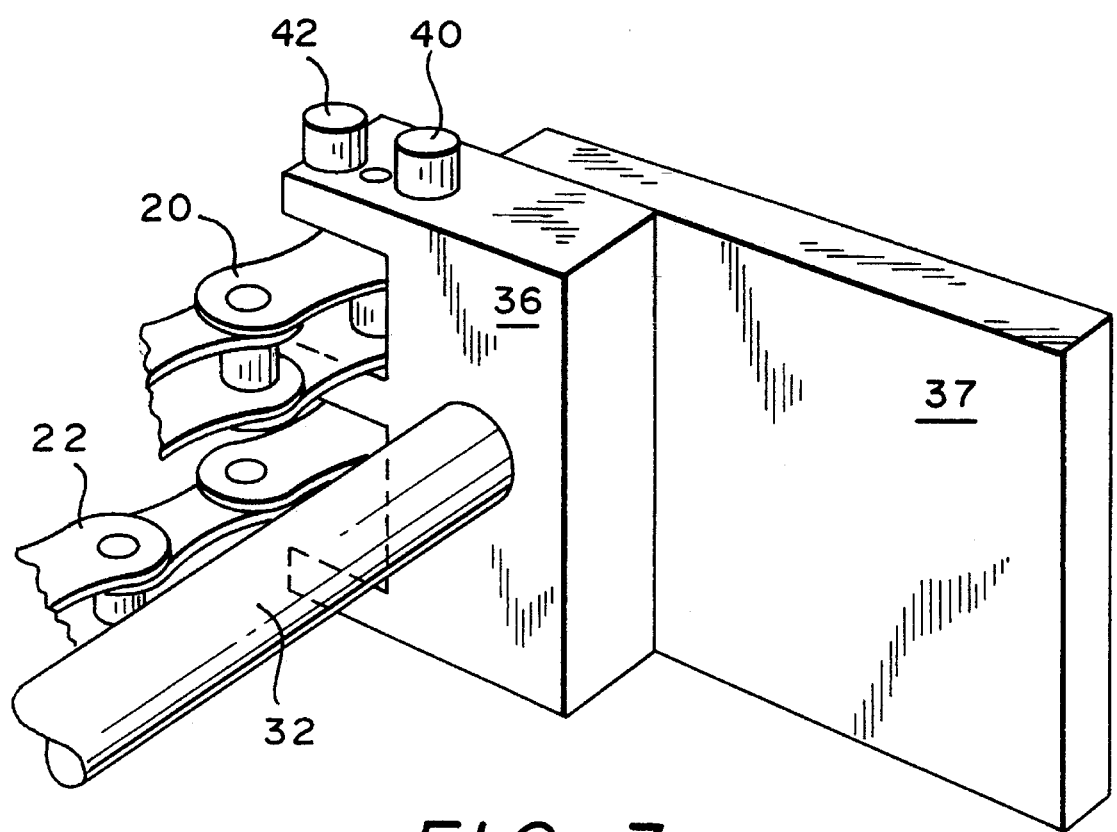
FIG. 3 is a perspective view which illustrates a portion of the adjustable pocket mechanism shown in FIG. 1.
Figure 4:
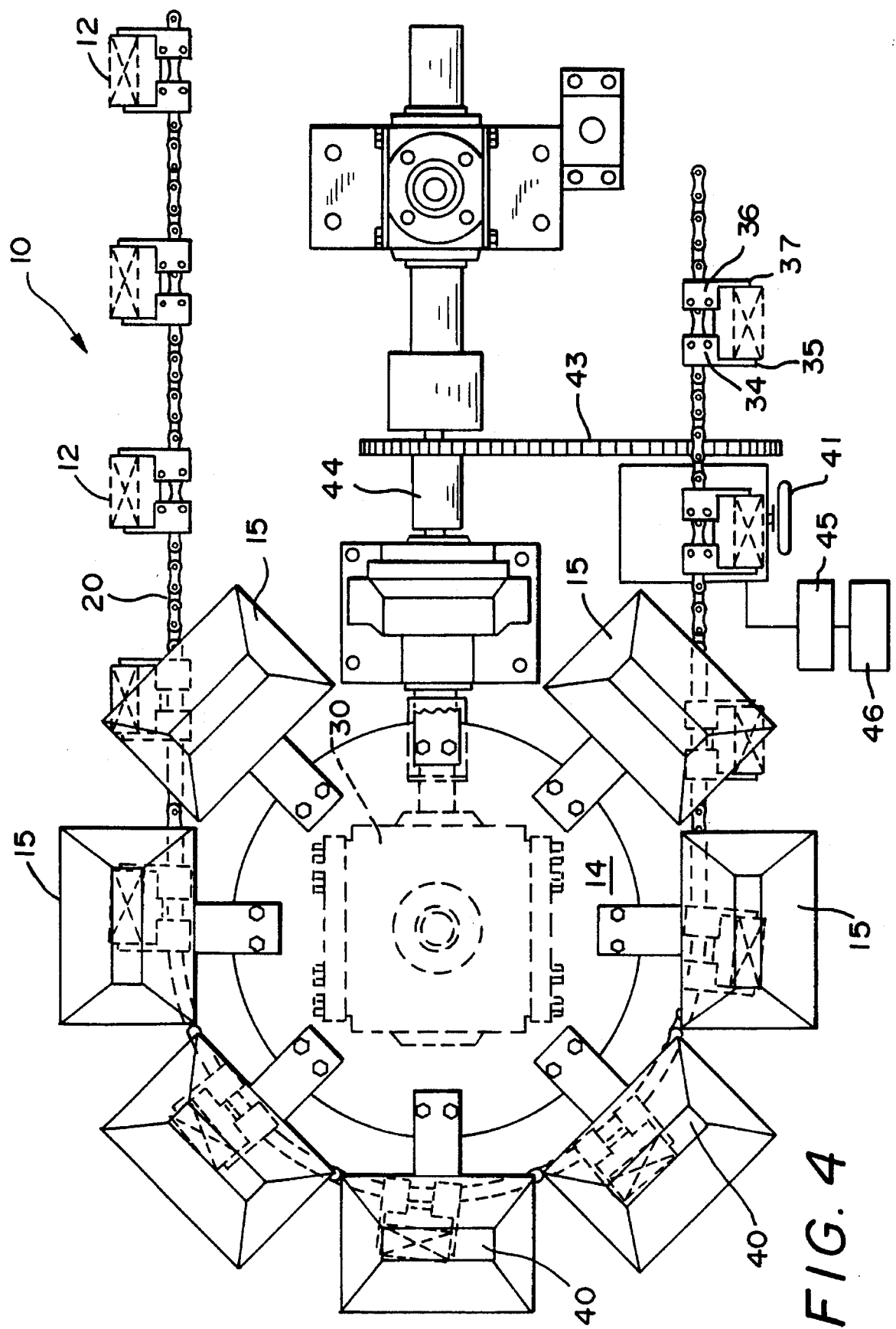
FIG. 4 is a top or plan view of a portion of a vertical cartoner which includes an adjustable pocket mechanism in accordance with the present invention.

As illustrated in FIGS. 2–4, an adjustable pocket mechanism 10 in accordance with the present invention, is constructed and arranged to transport a carton 12 (see FIG. 3) along a nonlinear pathway as it is carried through its filling and sealing operations in a vertical cartoner. However, it should be recognized that the invention is equally applicable to a horizontal cartoner. As shown more clearly in FIG. 3, a plurality of cartons 12 are shown as they travel along a linear path and around a semi-circular path defined by a pair of parallel sprockets 14 and 16 as the carton passes through and beyond the filling operation. A second pair of sprockets (not shown) lie in the same planes as sprockets 14 and 16 to complete a generally rectangular pathway with semi-circular ends. As the cartons 12 are transported to a curved portion of the pathway, they are brought into register with a plurality of fillers 15. The plurality of fillers or spouts 15 are mounted on sprocket 16 and rotated thereby so that they are brought into register with the cartons 10 as the cartons follow a semi-circular pathway around sprocket 16. Therefore, it is important that the cartons are maintained square so that they are in register with a spout portion of fillers 15. If not, a portion of the charge would be dumped on the outside of the carton which would result in partial filling of the carton and a portion of the charge falling on the floor and/or into the machinery.

The adjustable pocket mechanism 10 includes a pair of parallel endless chains 20, 22 which are disposed one above the other around sprockets 14 and 16. The mechanism also includes a pair of lugs 34 and 36. A first of the lugs 34 referred to as a leading transport lug is fixed to a first or top of the endless chain 20 and at the same time slidably engages a lower of the endless chains 22. In other words, the leading lug 34 is free to move forwardly or rearwardly with respect to the lower chain 22. A second of the lugs 36 or trailing lug is then fixed to the second or lower chain 22 and slidably engages the first or upper chain 20 so that it is freely movable forwardly and rearwardly with respect to the first of the chains 20.

Means such as a clutch mechanism 30 are provided for adjusting the chains relative to one another and for fixing the relative position of the sprockets and/or chains as illustrated in FIG. 4. As illustrated, the simple clutch mechanism 30 may be used to lock the upper sprocket 16 and lower sprocket 14 together. In this way, a simple drive mechanism such as the shaft 19 driven by a motor (not shown) rotates the upper sprocket 16. Since the upper sprocket 16 is in locked engagement with the lower sprocket 14, the two endless chains 20 and 22 are moved about the sprockets at the same speed and in the same relative position. Then, when it is desired to adjust the length of the pocket, the clutch is disengaged so that the upper sprocket moves forward or rearwardly with respect to the lower sprocket to thereby change the length of the pocket. The means for adjusting the relative position of the sprockets and chains may take the form shown in U.S. Pat. No. 4,718,540, entitled "Automatic Change Over for a Cartoner", which is incorporated herein in its entirety by reference. However, as presently envisioned, a more simplified arrangement may be used.

It is also contemplated that the relative position of the upper and lower chains 20 and 22 can be adjusted manually by means of a knob 41. The knob 41 moves a driving element 43 and drive member 44 to position the sprocket 16 with respect to sprocket 14 in a conventional manner. It is also contemplated that such adjustments can be accomplished by means of a computer 45 and input 46.

A key feature of the present invention is the mechanism for maintaining the squareness of the carton as it passes around a semi-circular pathway. That mechanism incorporates a guide rod 32 which may be of any convenient cross-section such as circular or square. The guide rod 32 extends through leading and trailing elements 34 and 36 to fix the elements 34 and 36 in a parallel relationship with one another. A pair of fingers 35 and 37 or carton gripping members are fixed to and extend outwardly from elements 34 and 36. Rod 32, which is cylindrical in a preferred embodiment of the invention, is fixed within a sleeve within element 34, as for example, by being press-fit therein. Other means for fixing the guide rod 32 to element 34 may be used. The guide rod 32 passes through a second sleeve in the second or trailing lug 36. The guide rod 32 slidably engages the second sleeve so that the distance between element 34 and element 36 can be varied by sliding the elements 34 and 36 closer together are further apart. In either case, this parallel relationship is maintained by the guide rod 32 in cooperation (close fit) with the sleeve in lug or element 36.

A pair of rollers 40 and 42 as shown more clearly in FIG. 3 are disposed on each of the elements 34 and 36 for engaging a rail (not shown) to thereby guide the elements 34 and 36 along a selected pathway (see FIG. 4).

The distance between elements 34 and 36 are adjusted to accomplish carton 12 of different width and positioned with respect to sprocket 16 so that the open "squared" cartons 12 are brought into alignment with or into register with the fill or spouts 15 so that a charge of material may be emptied into each of the cartons 12. As shown in FIG. 4, an opening 40 appears larger (longer) than a width the carton 12. However, it is contemplated that the size of such openings will be matched with the size of a carton at the time of a change over.

It should also be recognized that the radius of sprockets 14 and 16 should be sufficient to accommodate the change in the length of the pocket. For example, in a presently preferred embodiment of the invention, each of the sprockets has a diameter of about 24 inches while the longitudinal adjustment of the pocket is limited to about 7 inches. It is presently believed that the diameter of the sprocket should be about 3 times the length of the pocket adjustment so that the parallelism of the pocket as it passes around the sprocket does not cause the chain to become disengaged.

While the invention has been described in connection with its preferred embodiment, it should be recognized that changes and modifications may be made therein without departing from the scope of the appended claims.

What is claimed is:

1. An adjustable pocket mechanism for a cartoner of the type having a plurality of adjustable pockets to accommodate different sizes of cartons and means for transporting the cartons along a non-linear pathway, said adjustable pocket mechanism comprising a pair of parallel endless chains, a leading transport lug fixed to a first of said chains and freely movable forwardly and rearwardly in the direction of movement with respect to the second of said chains, a trailing transport lug fixed to said second of said chains and freely movable forwardly and rearwardly in the direction of movement with respect to said first of said chains, means for adjusting the chains relative to one another and means for fixing the relevant position of said chains with respect to one another so that the length of the pocket formed by said leading and trailing lugs can be adjusted to accommodate different sizes of cartons, and means for maintaining the leading and trailing lugs parallel as they are transported along a non-linear pathway.

2. An adjustable pocket mechanism according to claim 1 in which said means for maintaining the leading and trailing lugs parallel as the pocket is transported along a non-linear pathway include a rod and sleeve assembly wherein said rod slidably engages said sleeve and wherein said rod is fixed to one of said lugs and said sleeve is formed in the other of said lugs.

3. An adjustable pocket mechanism according to claim 2 which said non-linear pathway is within a generally horizontal plane.

4. An adjustable pocket mechanism according to claim 3 in which a first of said pair of parallel endless chains is disposed above said second of said parallel endless chains.

5. An adjustable pocket mechanism according to claim 4 which includes a pair of rail followers disposed on each of said lugs.

* * * * *